United States Patent [19]

Thomas et al.

[11] 4,270,353
[45] Jun. 2, 1981

[54] SERVO BOOSTERS FOR VEHICLE BRAKE SYSTEMS

[75] Inventors: Alfred W. Thomas, Saarbrucken; Ulrich W. Danne, Bendarf-Sayn, both of Fed. Rep. of Germany

[73] Assignee: Girling Limited, Birmingham, England

[21] Appl. No.: 936,512

[22] Filed: Aug. 24, 1978

[30] Foreign Application Priority Data

Oct. 20, 1977 [GB] United Kingdom ............... 43644/77

[51] Int. Cl.³ .............................................. B60T 13/00
[52] U.S. Cl. .................................... 60/547 R; 60/581; 91/369 A; 92/98 D; 92/165 PR
[58] Field of Search ................... 60/547 R, 552, 553, 60/554, 581; 92/98 D, 99, 165 R, 165 PR, 166; 91/369 R, 369 A, 369 B

[56] References Cited

U.S. PATENT DOCUMENTS

| 2,369,797 | 2/1945 | Rappl ..................................... 92/166 |
| 3,013,535 | 12/1961 | Schultz ................................. 91/369 B |
| 3,146,684 | 9/1964 | Vanderhoof ......................... 92/165 R |
| 3,312,147 | 4/1967 | Reichard ................................. 60/547 |
| 3,411,409 | 11/1968 | Bunyard ................................. 92/166 |
| 3,805,680 | 4/1974 | Weatherhogg ......................... 92/48 |
| 3,981,227 | 9/1976 | Azvma ................................ 92/98 D |
| 4,056,043 | 11/1977 | Sriramamurty ..................... 92/98 D |
| 4,126,996 | 11/1978 | Leiber ................................. 60/554 |

FOREIGN PATENT DOCUMENTS 2306630 9/1974 Fed. Rep. of Germany ...... 92/165 PR

Primary Examiner—Abraham Hershkovitz
Attorney, Agent, or Firm—Scrivener, Clarke, Scrivener and Johnson

[57] ABSTRACT

In order to reduce the distortion of a servo booster housing in use the booster is provided with one or more force transmitting means which extend through the movable wall for transmitting reaction forces directly from the master cylinder housing to the vehicle bulkhead between which the booster is mounted. This enables a housing of lighter weight to be employed, and an overall saving in weight may be achieved.

26 Claims, 7 Drawing Figures

SERVO BOOSTERS FOR VEHICLE BRAKE SYSTEMS

SPECIFIC DESCRIPTION

This invention relates to servo booster assemblies for vehicle brake systems of the kind comprising a housing including at least two opposed housing shells or walls, a movable wall dividing the interior of the housing into at least two chambers, and a control valve assembly responsive to relative movement of an output member and an input member.

The control valve assembly may be remote from the housing.

The movable wall may be a diaphragm assembly comprising a diaphragm of elastomeric or other flexible material and a diaphragm support plate.

The current world-wide shortage of fossil fuel reserves coupled with an ever increasing demand highlights the necessity for fuel saving measures. One example of this is the trend towards lighter motor vehicles. Consideration is given to saving every gram of basic vehicle weight in spite of the extra first cost which this often entails. Thus energy is saved by producing lighter parts and even fossil oil by-products are used to achieve weight saving.

In this connection, it has already been demonstrated that vacuum servo housings can be produced from plastics materials. However, with the usual arrangement in which one shell is connected in use to the vehicle bulkhead, and the other shell through which the output member extends is connected to a master cylinder housing, the output force applied to the master cylinder piston by the booster output member is reacted back to the vehicle bulkhead substantially through the shells of the servo housing.

The quantity of plastics material that has therefore been required to afford the requisite stiffness and fatigue strength of the housing with such designs has been so great that the objective of saving weight and scarce raw material has not been realised.

It is an object of the present invention to enable the weight of a servo housing to be considerably reduced.

According to the invention a servo booster assembly comprises a housing, first and second opposed housing shells or walls of said housing, a movable wall dividing the interior of said housing into two chambers, an output member, an input member, a control valve assembly responsive to relative movement of said output and input members, at least one stationary force transmitting means extending through said movable wall from said first to said second shell or wall for transmitting reaction forces and means sealing said movable wall to said tie.

Since the force transmitting means is preferably arranged so as to transmit in use substantially all of the reaction forces from a master cylinder housing to a vehicle bulkhead, the strength of the shells or walls and hence their weight can be reduced and an overall saving in weight may be achieved.

Each force transmitting means preferably comprises a tie.

The tie or ties may simply comprise studs of circular cross-section, but any suitable form of tie may be used.

Each sealing means may comprise a seal carried by the movable wall and slidably engaging with the tie, or it may, for example, comprise a rolling diaphragm member secured to both the movable wall and the tie.

When the movable wall comprises a diaphragm assembly the sealing means preferably seals the diaphragm support plate to the respective tie. Alternatively a portion of the main diaphragm may be arranged to form said seal means.

Although a single tie may suffice in certain circumstances there are preferably two ties.

Preferably at least one end of each force transmitting means projects outwardly of the housing, or is accessible from the exterior of the housing, and is screwthreaded for connection to a master cylinder housing or the vehicle bulkhead.

The tie or ties may constitute the means principally retaining in use the two shells clamped together or in spaced relation.

The invention will now be further described, by way of example only, with reference to the accompanying drawings in which.

Figure 1:
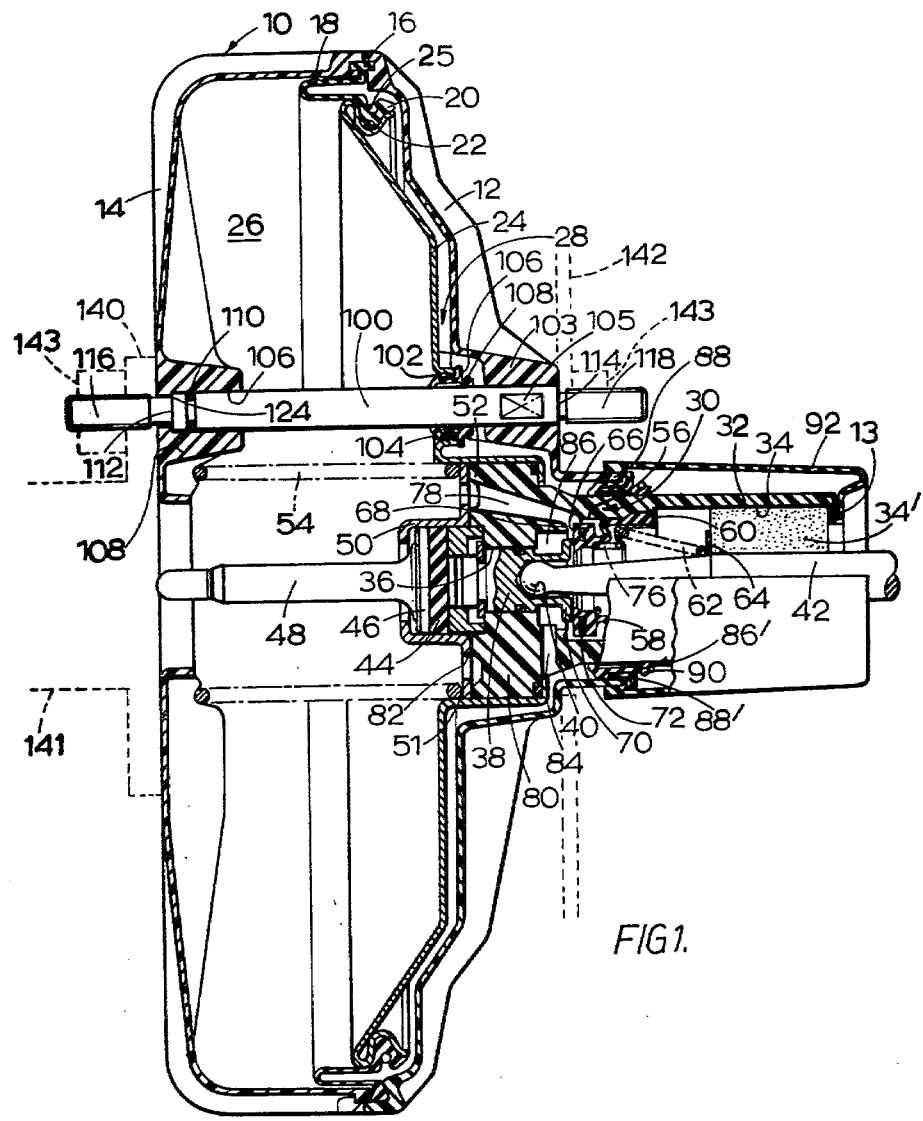
FIG. 1 is a section on the line A—A of FIG. 2, of one embodiment of a vacuum servo booster constructed in accordance with the present invention, portions of a master cylinder housing and of a vehicle bulkhead being shown in dotted outline.

It is to be understood that the embodiment described hereinafter is merely illustrative of the wide variety of possible servo booster arrangements to which the present invention is applicable.

The illustrated booster has a housing, generally designated by the reference number 10, which is made up of two generally cup-shaped parts (shells or walls) 12 and 14 whose peripheries are adapted to be disposed in mutual engagement so as to clamp therebetween a thickened outer peripheral bead portion 16 of an elastic diaphragm 18. The inner peripheral edge portion 20 of the diaphragm 18 is stretched into position in and then firmly clamped within a slot 22 on the outer periphery of an annular support plate 24 by a tensioned ring 25 so as to form a rolling diaphragm seal, the support plate and diaphragm serving to divide the interior of the housing 10 into two chambers 26 and 28.

The booster includes a poppet valve arrangement, indicated generally by the reference numeral 30, which includes a generally cylindrical valve body member 32 having an internal bore 34 which extends axially of the booster housing. The internal bore 34 of the valve body has portions of different diameter, the smallest diameter portions 36 of which slidably receives a cylindrical thrust member 38 whose rearward end is formed with a ball socket 40 which receives a corresponding ball on the forward end of a valve actuating rod 42. The forward end of the thrust member 38 projects out of the valve body member 32 and extends towards one side of a rubber disc 44, the other side of the disc 44 being engaged by a flanged end 46 of an output rod 48 leading to a brake master cylinder (not shown). The flanged part 46 of the output rod and the disc 44 are located relative to the valve body member 32 by means of a generally cup-shaped retaining plate 50 which is held against the forward end of the valve body member, within a cylindrical inner peripheral portion 52 of the diaphragm support member 24, by means of a main coil spring 54 effective between this plate 50 and the housing part 14 also by crimpings at locations 51.

Located within an intermediate bore portion 56 of the valve body 32 is an axially flexible valve closure member 58 whose rearward thickened end is rigidly clamped to the bore by means of a clamp 60 which is urged forwardly by a coil spring 62 acting between the clamp 60 and a collar 64 attached to the valve actuating rod 42. The forward end of the valve closure member 58 is also thickened and provides a flat, radially extending surface 66 which can co-operate both with an outer cylindrical valve seat 68 formed on the valve body member 32 and with an inner cylindrical valve seat 70 formed on the rearward end of the thrust rod 38. The interior of a forward thickened portion of the valve closure member encloses an annular stiffening ring 72, the inner periphery of the latter thickened portion being engaged by a coil spring 76, acting between this thickened portion and the clamp 60, which urges this thickened portion towards said valve seats.

The rearward end of the valve body bore 34 communicates with the atmosphere via an air filter 34'. The outer valve seat 68 communicates with the front chamber 26 of the housing via a passage 78 in a thickened front portion 80 of the valve body 32 and via bores 82 in the retaining plate 50. The rear housing chamber 28 communicates via a passage 84 in the valve body with a chamber 86 located forwardly of the inner valve seat 70.

In order to enable the valve body 32 to slide axially relative to the housing 10, a fluid tight seal 86' is located around the valve body 32 within a rearwardly extending, cylindrical extension 88 of the housing part 12, the seal 86' containing a flanged annular stiffening ring 88' and being clamped against the valve body by means of a tensioned ring 90. The latter seal 86' is protected against the ingress of dirt and foreign bodies by means of a flexible rubber boot 92 whose forward end engages the cylindrical extension 88 of the housing part 12 and whose rearward end 13 is connected to the extreme rearward end of the valve body member 32. In other embodiments, the rearward end of the boot 92 could alternatively be connected directly to the stem of the valve actuating rod 42. In the latter case, the boot could require apertures in it to allow the above mentioned communication between the valve body bore and the atmosphere.

The booster as thus far described operates in a conventional manner as follows. In the unactuated state of the booster (FIG. 1), the thrust member 38 is urged towards the right, as viewed in FIG. 1, by virtue of the reaction force exerted by the coil spring 62, so that the valve seat 70 on the thrust member engages the surface 66 on the valve closure member 58 urging the thickened forward portion of the latter member to the right. Under these conditions, the housing chamber 28 is isolated from the atmosphere by the first poppet valve part formed by the aforegoing members 70 and 66. However, both chambers 26 and 28 are also connected together via the apertures 82, passage 78, chamber 86 and passage 84 and the open second poppet valve part between the outer valve seat 68 and the surface 66. Both chambers are connected to vacuum in this condition of the booster by way of a conventional vacuum connection 89 (see FIG. 2) in the wall of the housing part 14, the booster then being described as being in its vacuum-suspended state.

Movement of the actuating rod 42 to the left, for example by operation of a foot pedal, causes the thrust member 38 to follow. During this movement, the first poppet valve part remains closed due to the action of the spring 76. Eventually, however, the surface 66 of the valve closure member engages the outer valve seat 68 so that the second poppet valve closes so isolating the chambers 26 and 28 from one another. Further movement of the thrust member 38 to the left causes the valve seat 70 to part from the surface 66 thus opening the first poppet valve and connecting the rearward chamber 28 to atmosphere. The pressure differential so developed across the diaphragm 18 and support plate 24 then acts to displace the latter members to the left against the force of the main spring 54, this movement being transferred to the output rod 48 to actuate the master cylinder (not shown). The magnitude of the pressure differential developed across the diaphragm and support plate, and hence the output force applied to the brakes, is dependent upon the degree of opening of the first poppet valve comprised by the parts 70 and 66 and thus upon the magnitude of the axial movement of the input rod 42.

During operation of the booster as described above, the housing is subjected to stresses as a result of the vacuum conditions within the internal chambers and also the loads and reactions exerted by the various moving components. These stresses are conventionally accommodated by constructing the housing parts 12, 14 either of relatively thin but heavy materials or of light but relatively thick materials. The present design enables such stresses to be accommodated while using light and relatively thin materials by the provision of force transmitting means comprising at least two ties in the form of studs 100 (only one shown in FIG. 1) which are disposed in directions parallel to the booster axis so as to extend between and interconnect the two housing parts 12 and 14. Each stud 100 passes slidably through the support plate 24 for the diaphragm so that the support plate can perform its axial displacement without hindrance during operation of the booster. In the embodiment, each stud 100 extends through a respective aperture 102 in the support plate 24 with a flexible seal 104 press fitted therebetween. The seal can include a metal stiffener 106 and a tensioned clamping ring 108. Each seal may also form a grease pocket.

Alternatively, each seal 104 could be replaced by a flexible boot attached at one end to the associated support plate aperture 102 and at its other end to the stud at a location within the chamber 26.

Figure 2:
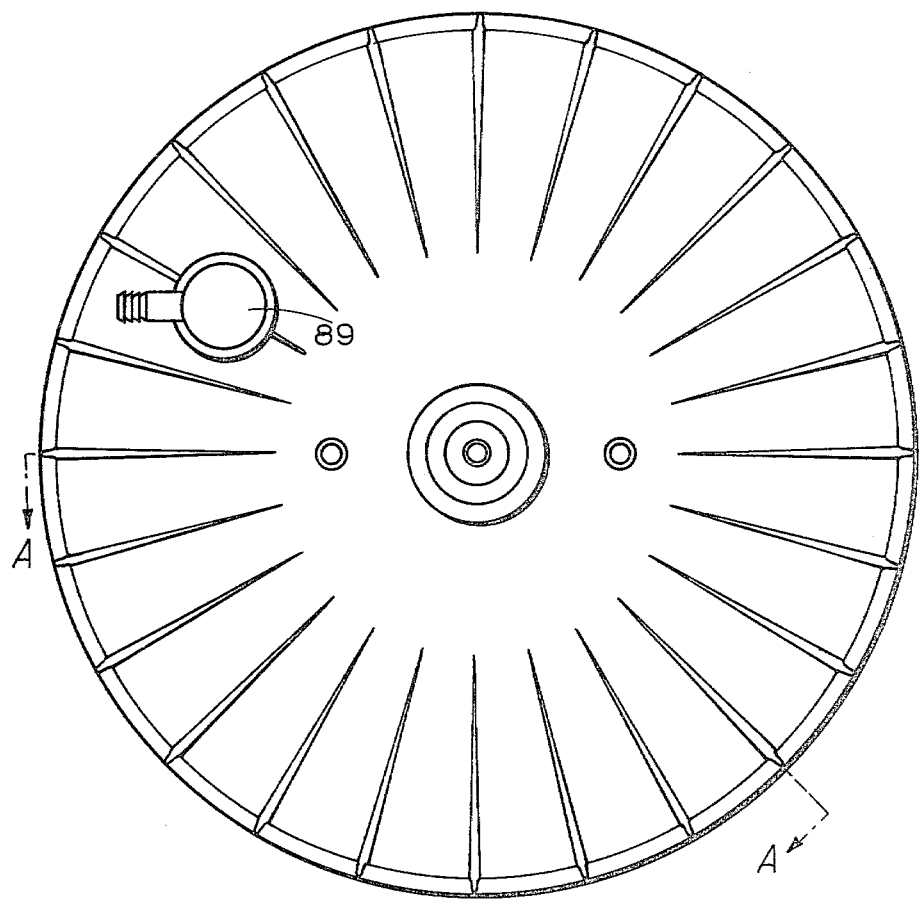
FIG. 2 is a front view of the booster of FIG. 1.

In the FIG. 1 embodiment, the right hand ends of the studs 100 are permanently attached to the right hand housing portion 12 by being moulded into a thickened portion 103 of the latter during its formation. Flats 105 ensure that rotation of the studs relative to the housing cannot occur. The left hand ends of the studs 100 pass through respective bores 106 in a thickened portion 108 of the housing portion 14, the studs being sealed to the latter bores, for example by O-ring seals 110.

As shown in FIG. 1, the axial length between shoulders 112, 114 on each stud 100 can be chosen to be slightly less than the total length of the booster housing so that the two housing portions 12, 14 are clamped together when screw-threaded end portions 116, 118 of the studs are passed through appropriate mounting plates and attached thereto by suitable nuts 143. Preferably, the screw-threaded portions 118 on the right hand side of the booster are passed through and secured to the vehicle bulkhead 142 and the shoulder 114 is flush with the outer face of the housing as shown. The screw-threaded portions 116 on the left hand side are secured to a flange 140 at the rear end of a master cylinder housing 141 of the brake of the brake system. The booster housing parts 12, 14 are then substantially completely relieved of stresses due to input and output forces and tend only to deflect inwards when vacuum is applied. In other embodiments, the housing can be attached to the bulkhead but not the master cylinder, or to the master cylinder and not the bulkhead.

With the aforegoing arrangement, since the two halves of the housing are not clamped together until the booster is fitted between the master cylinder and the bulkhead in its operational position, for initial transport and storage purposes a means must be provided for holding the two housing parts together and preventing them from falling apart. This can be achieved in a number of ways. For example, the bores 106 receiving the studs can have resilient members in their surfaces adapted to snap into corresponding peripheral grooves in the stud surfaces, or vice versa. Alternatively, the two halves of the housing can be bonded together by adhesive in the region radially outwardly of the outer bead portion of the diaphragm 18. Yet another alternative is to construct the engaging surfaces of the two housings such that they form a snap fit engagement as shown at the bottom of FIG. 1.

Figure 4:
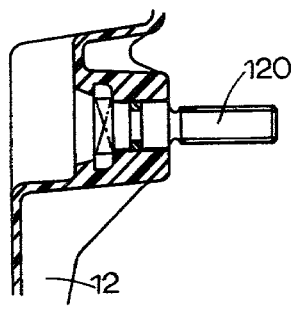
FIG. 4 is a detail of a further embodiment in accordance with the invention.
Figure 5:
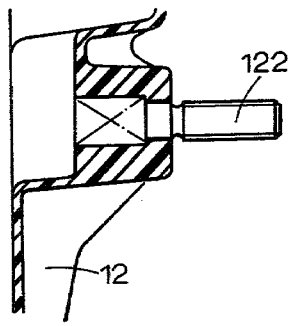
FIG. 5 is a detail of a still further embodiment in accordance with the invention.

In the event that the studs 100 are not required to pass through the bulkhead, or when additional support is required, further studs may be provided on the housing 10, for example by press fitting as shown at 120 in FIG. 4 or by moulding as shown at 122 in FIG. 5. Similar arrangements can be provided where necessary on the other housing part 14 for attachment to the master cylinder.

If due to installational requirements it is necessary to arrange that the studs 100 do not run directly through from the bulkhead to the master cylinder flange, the studs may be offset and fitted with separate nuts or other retaining means. The regions of the housing parts 12, 14 between the studs are the points of attachment to the bulkhead and/or the master cylinder would then be required to be locally reinforced.

Figure 6:
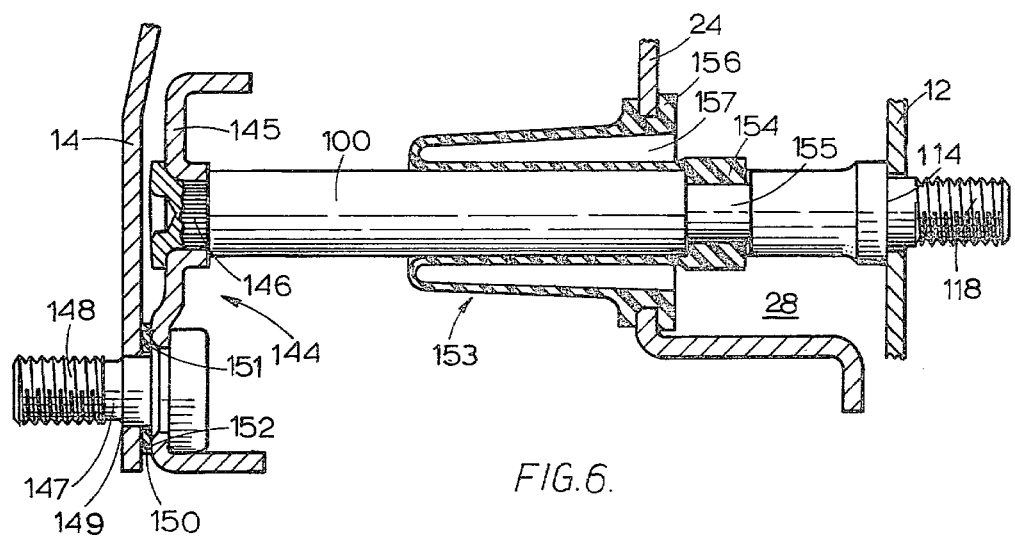
FIG. 6 shows a modified arrangement in which a tie has a cranked end portion.

Alternatively, as shown in FIG. 6, the tie may be arranged to have a cranked end part 144. In the construction of FIG. 6, the housing shells 12 and 14 are formed of sheet metal, and the tie comprises stud 100 provided at its rear end with a threaded end portion 118 projecting through housing shell 12 for connection directly to a vehicle bulkhead, a transversely extending pressed metal bracket 145 rivetted at 146 to the front end of stud 100, and a tie end portion in the form of short stud 147 rivetted to bracket 145 and displaced transversely from stud 100. Stud 147 has a threaded end part 148 which projects forwardly through a hole 149 in front housing shell 14, and the stud 147 is sealed to shell 14 by an annular resilient seal 150 sandwiched between shell 14 and a shoulder 151 produced on stud 147 by the rivetting operation, and the front face 152 of bracket 145. In use an annular resilient seal would be located around stud end portion 118 in face contact with rear housing shell 12 to seal the rear booster chamber 28.

The arrangement of the tie in FIG. 6 enables the pair of studs 147 that are secured in use to the master cylinder housing to be closer together than the pair of studs 100. This may be necessary in some applications of the invention, to provide sufficient room for valve body 32 of the booster for example.

In another modification, not illustrated, the bracket 145 is located externally of the housing shell 14.

Brackets may be provided at both ends of a stud if desired.

With further reference to FIG. 6, the movable wall of the booster is sealed to each stud 100 by means of rolling diaphragm 153 having an inner peripheral annular bead 154 sealingly received within an annular groove 155 in stud 100 and by an externally grooved outer peripheral bead 156 sealingly embracing the marginal portions of diaphragm support member 24 surrounding a hole 157.

Figure 7:
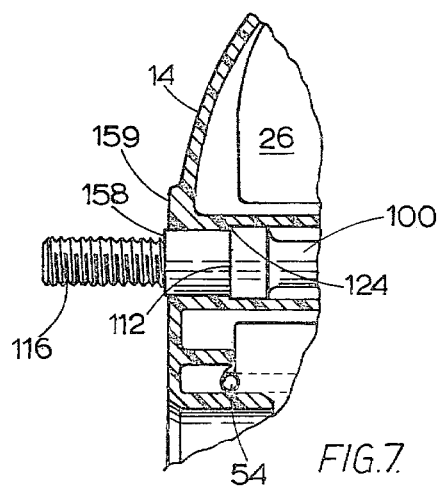
FIG. 7 shows yet another modified stud arrangement.

FIG. 7 shows a modified stud arrangement in which the stud 100 is provided with a pair of axially spaced outwardly facing shoulders 112 and 158 which are more widely spaced axially than are inwardly facing shoulder 124 and front face 159 of front housing shell 14 such that shoulder 158 is proud of face 159 for engagement with the flange of a master cylinder housing. The front housing shell 14 does not then bear the clamping forces between the master cylinder housing and studs 100. The stud 100 may be provided with such a projecting shoulder 158 at both ends if desired.

In normal use in a vehicle, the applied vacuum will tend to cause the housing parts 12, 14 to collapse inwardly, thus increasing the clamping and sealing load on the diaphragm bead 16. This collapsing movement is limited in the FIG. 1 embodiment by engagement of shoulders 124 with the shoulders 112 on the studs 100.

As mentioned above, known servo boosters deflect due to the loads being transmitted through the housing parts themselves. This results in lost brake pedal motion at high input force levels which has to be compensated by allowing a greater pedal stroke. Because the shells in the above described arrangements in accordance with the invention are relieved of stresses due to input and output forces, they may be made thinner and therefore lighter.

The studs themselves can be made from any material which is sufficiently stiff to limit deflection under load to an acceptably low figure. Metallic materials such as steel or aluminium alloy meet this requirement.

This invention is not confined to servo boosters of the single housing directly actuated type but may also be applied to tandem units and to remotely actuated (e.g. hydraulically) controlled embodiments.

The housing portions 12, 14 need not necessarily be of plastics material. Metals such as aluminium could also be employed. In the latter event a modified means of stud retention other than moulding would be required.

Figure 3:
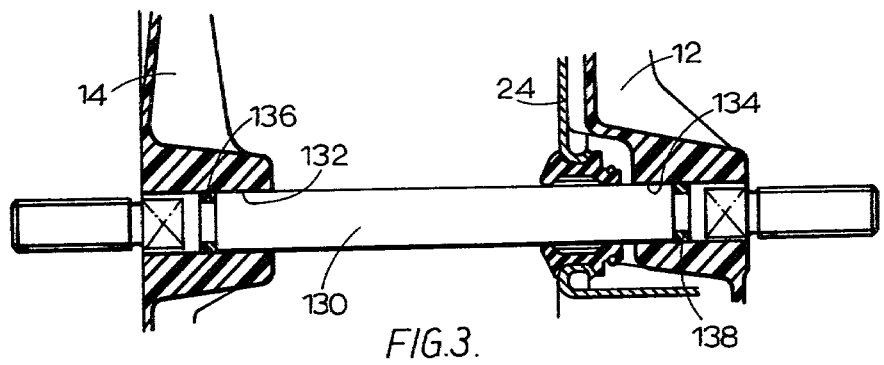
FIG. 3 shows a modified stud arrangement.

FIG. 3 shows a modified embodiment in which both ends of the studs 130 are slidably received in the corresponding housing bores 132, 134. The stud ends are sealed by means of seals 136, 138 and the studs are prevented from rotating by suitable flats.

If desired the screw-threaded end portions 116, 118 of the studs may be replaced by screw-threaded fastening members engaging with internal threads formed in the ends of the studs which may then be substantially flush with the exterior surface of the housing shells 12, 14.

Although the preferred number of ties is two, more than two can be used and in certain circumstances one only will suffice. For example, when a remote control valve assembly is employed, the housing shells, of which there would normally be two, may be fastened together by a single such tie which could conveniently be disposed centrally and coaxially of the two housing shells. In this case, the input member would be arranged in a position offset from the booster axis.

In some embodiments, the or each tie could be formed as an integrally moulded boss formed in the inner portion of one or the other of the two housing shells.

The housing construction of the present invention could also be used for air-suspended vacuum servos where, in the rest position, atmospheric pressure exists in front of and behind the movable wall and the control valve is so arranged as to admit a variable vacuum into the forward chamber when the input member is operated. In this case, the external forces are again either in balance (in the inoperative condition) or atmosphere tends to push the two housing shells together (in the operative condition).

It would also be possible to use substantially the same construction, with slight modifications, for compressed air servos. In this case, it would be necessary to crimp or otherwise fasten the peripheries of the two shells together in order to withstand the internal air pressure.

Nevertheless, the total assembly would be lighter than in conventional constructions because the housing shells could be made thinner than those hitherto manufactured and would be permitted to expand (or balloon) slightly under internal air pressure, because axial deformation, and therefore lost motion, would still be limited by the stud or studs.

The present invention lends itself readily to use in servos which are not of cylindrical form. In servos which are oval, square, or rectangular in section, there is a tendency for the movable wall to twist in its clearance with the housing which leads to wear and torsional stresses in the flexible diaphragm and probable subsequent failure. The provision of a tie or ties as previously described can prevent such twisting.

We claim:

1. In a servo booster assembly for vehicle brake systems comprising a housing having opposed walls, a movable wall positioned between said housing walls and dividing the interior of said housing into two chambers, an output member having an operative connection with said movable wall and operable through one of said housing walls, a control valve assembly having an operative connection with said housing, and an input member for operating said control valve assembly for controlling a supply of differential pressure to opposite sides of said movable wall, the invention comprising stationary force transmitting means extending through said movable wall from one to the other of said housing walls, means sealing said movable wall to said force transmitting means, and means for connecting said housing to a relatively fixed vehicle bulkhead in a position adjacent said force transmitting means with said force transmitting means being located to transmit substantially directly to said bulkhead reaction forces and substantially relieve said housing walls from said forces upon operation of said booster assembly, said housing walls being of a thickness and material which in the absence of said force transmitting means are incapable of accomodating the stresses of said reaction forces without excessive axial deformation.

2. In the servo booster assembly as in claim 1 wherein said force transmitting means comprises a tie.

3. In the servo booster assembly as in claim 2 wherein two ties are arranged symmetrically with respect to the axis of said input member.

4. In the servo booster assembly as in claim 1 wherein said sealing means comprises a seal carried by said movable wall and slidably engaging with said force transmitting means.

5. In the servo booster assembly as in claim 1 wherein said force transmitting means is provided with a threaded end portion.

6. In the servo booster assembly as in claim 5 wherein said end portion of said force transmitting means projects outwardly of said housing.

7. In the servo booster assembly as in claim 6 wherein said force transmitting means has projecting threaded end portions at both ends.

8. In the servo booster assembly as in claim 2 wherein one end of said housing walls is provided with a bore, said tie is a press-fit in said bore, and including further means sealing said tie in said bore.

9. In the servo booster assembly as in claim 2 wherein said tie comprises a rod.

10. In the servo booster assembly as in claim 1 wherein said movable wall comprises a diaphragm and a diaphragm support plate.

11. In the servo booster assembly as in claim 10 including an outer peripheral bead on said diaphragm, first and second opposed surfaces of said housing walls respectively defining opposed sides of an annular groove in which said peripheral bead is retained.

12. In the servo booster assembly as in claim 1 wherein said housing walls are formed of plastics material.

13. In the servo booster assembly as in claim 12 including thickened portions of said housing walls adjacent to said force transmitting means.

14. In the servo booster assembly as in claim 11 wherein said housing walls are provided adjacent to said annular groove with formations having a snap engagement with each other.

15. In the servo booster assembly as in claim 6 wherein said end portion is formed with an outwardly facing shoulder.

16. In the servo booster assembly as in claim 6 wherein said force transmitting means is formed with an outwardly facing shoulder which is flush with the outer face of said housing.

17. In the servo booster assembly as in claim 1 wherein said sealing means comprises a rolling diaphragm sealingly attached to said force transmitting means and to said movable wall.

18. In the servo booster assembly as in claim 1 including said vehicle bulkhead and a master cylinder housing wherein opposite ends of said force transmitting means are secured respectively to said master cylinder housing and to said vehicle bulkhead.

19. In the servo booster assembly as in claim 9 wherein said force transmitting means comprises an end portion which projects outwardly of said housing and is offset transversely with respect to said rod, and a bracket connecting said rod to said end portion.

20. In the servo booster assembly as in claim 19 wherein said bracket is located inwardly of said housing.

21. In the servo booster assembly of claim 1 wherein said connecting means are carried by said force transmitting means and include fastener elements for connecting said force transmitting means directly to said support in force transmitting relationship therewith.

22. In the servo booster assembly of claim 1 including a master cylinder, and means connecting said master cylinder with a wall of said housing in a position to be operatively engaged by said output member.

23. In the servo booster assembly of claim 1 including a master cylinder, and means directly connecting said master cylinder to a wall of said housing in substantially direct force transmitting relationship with said force transmitting means and in a position to be operatively engaged by said output member.

24. In the servo booster assembly of claim 23 wherein said force transmitting means comprises a tie extending between the respective walls, and the connecting means for the housing and for the master cylinder comprise threaded ends on said tie which extend sealingly through the respective walls for releasable connection with a support and with said master cylinder, respectively.

25. In a servo booster assembly for vehicle brake systems comprising a housing having opposed walls, a movable wall positioned between said housing walls and dividing the interior of said housing into two chambers, an output member having an operative connection with said movable wall and operable through one of said housing walls, means for controlling a supply of differential pressure to opposite sides of said movable walls comprising a control valve assembly having an operative connection with said housing and an input member for operating said control valve assembly, the invention comprising stationary force transmitting means extending through said movable wall from one to the other of said housing walls, means sealing said movable wall to said force transmitting means, and means for connecting said housing to a relatively fixed vehicle bulkhead in a position wherein said force transmitting means is located in force transmitting relationship with respect to said bulkhead for transmitting substantially directly to said bulkhead reaction forces and substantially relieve said housing walls from said forces upon operation of said booster assembly, said housing walls being of a thickness and material which in the absence of said force transmitting means are incapable of accomodating the stresses of said reaction forces without excessive axial deformation.

26. In a servo booster assembly for vehicle brake systems comprising a housing having opposed housing walls each having radially inner and outer portions, a movable wall positioned between said housing walls and dividing the interior of said housing into two chambers, an output member having an operative connection with said movable wall and operable through said radially inner portion of one of said housing walls, means for controlling a supply of differential pressure to opposite sides of a said movable wall comprising a control valve assembly and an input member for operating said control valve assembly, the invention comprising stationary force transmitting means extending through said movable wall from the radially inner portion of one of said housing walls to the radially inner portion of the other of said housing walls, means sealing said movable wall to said force transmitting means, and means for connecting said housing to a relatively fixed vehicle bulkhead in a position adjacent to where said force transmitting means is located to transmit substantially directly to said bulkhead reaction forces which in the absence of said force transmitting means would be transmitted through both said radially outer portions of said housing walls, and substantially relieve at least said radially outer portions of said walls from said forces upon operation of said booster assembly, said housing walls being of a thickness and material which in the absence of said force transmitting means are incapable of accomodating the stresses of said reaction forces without excessive axial deformation.

* * * * *

UNITED STATES PATENT AND TRADEMARK OFFICE
CERTIFICATE OF CORRECTION

PATENT NO. : 4,270,353
DATED : June 2, 1981
INVENTOR(S) : Alfred W. Thomas and Ulrich W. Danne It is certified that error appears in the above-identified patent and that said Letters Patent are hereby corrected as shown below:

Column 1, line 56, change "tie" to --force transmitting means--;

Column 3, line 17, change "rod" to --member--;

Claim 26, line 17 of column 10, before "said" delete "a".

Signed and Sealed this

Seventeenth Day of November 1981

[SEAL]

Attest:

GERALD J. MOSSINGHOFF

*Attesting Officer*  *Commissioner of Patents and Trademarks*